(12) United States Patent
O'Connor

(10) Patent No.: US 9,529,670 B2
(45) Date of Patent: Dec. 27, 2016

(54) STORAGE ELEMENT POLYMORPHISM TO REDUCE PERFORMANCE DEGRADATION DURING ERROR RECOVERY

(71) Applicant: INTERNATIONAL BUSINESS MACHINES CORPORATION, Armonk, NY (US)

(72) Inventor: James A. O'Connor, Ulster Park, NY (US)

(73) Assignee: International Business Machines Corporation, Armonk, NY (US)

( * ) Notice: Subject to any disclaimer, the term of this patent is extended or adjusted under 35 U.S.C. 154(b) by 111 days.

(21) Appl. No.: 14/280,014

(22) Filed: May 16, 2014

(65) Prior Publication Data

US 2015/0331746 A1 Nov. 19, 2015

(51) Int. Cl.
*G06F 11/10* (2006.01)
*G06F 3/06* (2006.01)

(52) U.S. Cl.
CPC .......... *G06F 11/1076* (2013.01); *G06F 3/064* (2013.01); *G06F 3/0619* (2013.01); *G06F 3/0685* (2013.01); *G06F 3/0689* (2013.01); *G06F 11/1092* (2013.01)

(58) Field of Classification Search
CPC .............. G06F 11/1092; G06F 11/1076; G06F 11/0727; G06F 11/108; G06F 11/14; G06F 11/1402; G06F 11/08; G06F 2211/1028; G06F 2211/104; G06F 2211/1061; G06F 2211/1088
See application file for complete search history.

(56) References Cited

U.S. PATENT DOCUMENTS

| | | | | |
|---|---|---|---|---|
| 8,392,797 B2* | 3/2013 | Cheng | ................. | G06F 11/1068 714/763 |
| 2003/0070042 A1* | 4/2003 | Byrd | .................... | G06F 11/1076 711/114 |
| 2003/0070113 A1* | 4/2003 | Ferguson | .................. | H04L 1/22 714/5.11 |
| 2003/0233611 A1* | 12/2003 | Humlicek | ........... | G06F 11/1092 714/763 |
| 2004/0250161 A1 | 12/2004 | Patterson | | |
| 2008/0148124 A1* | 6/2008 | Zhang | ................. | G06F 11/1008 714/752 |
| 2009/0327840 A1* | 12/2009 | Moshayedi | ......... | G06F 11/1441 714/773 |
| 2014/0317479 A1* | 10/2014 | Candelaria | .......... | G06F 11/1004 714/807 |

* cited by examiner

*Primary Examiner* — Nadeem Iqbal
(74) *Attorney, Agent, or Firm* — Brian F. Russell; Steven L. Bennett

(57) ABSTRACT

A data storage system includes a plurality of storage devices forming a storage array for storing data and associated error correction codes and a controller coupled to the plurality of storage devices. The controller is configured to, responsive to an error in a data element among the data, rebuild the data element from other data elements and an error correction code in the storage array and overwrite the error correction code with the rebuilt data element.

14 Claims, 5 Drawing Sheets

Figure 4

STORAGE ELEMENT POLYMORPHISM TO REDUCE PERFORMANCE DEGRADATION DURING ERROR RECOVERY

BACKGROUND OF THE INVENTION

The present invention relates in general to data processing systems and, in particular, to use of storage element polymorphism to reduce performance degradation during error recovery.

Computer systems typically include a large amount of both nonvolatile data storage (e.g., Hard Disk Drives (HDD) or Solid State Drives (SSDs)) and volatile data storage (e.g., Random Access Memory (RAM)) to hold information such as operating system software, programs and other data. As is well known in the art, this information is commonly stored in binary format (1's and 0's), where each individual binary digit is referred to as a "bit" of data. Bits of data are often grouped to form higher level constructs, such as 8-bit "bytes" and 8 or 16-byte data "words."

The circuits in RAM and SSD used to store voltage levels representing bits are subject to both device failure and state changes due to high energy cosmic rays and alpha particles. HDDs are also subject to device failures and to imperfections in the magnetic media that can change the magnetic fields representing the bits and thus not accurately represent the originally stored data. Depending on which bit is affected by an error, the error of just a single bit can cause an entire process, an entire partition, or even an entire computer system to fail. When an error occurs, whether a single bit error, multi-bit error, full chip/device failure or full memory module failure, all or part of the computer system may remain down until the error is corrected or repaired. Downtime attributable to individual errors and/or to all errors collectively can have a substantial impact on computer system performance and on a business dependent on its computer systems.

The probability of encountering an error during normal computer system operation has increased concomitantly with the capacity of data storage in computer systems. Techniques to detect and correct bit errors have evolved into an elaborate science over the past several decades. One of the most basic detection techniques is the use of odd or even parity where the 1's or 0's in a data word are exclusive OR-ed (XOR-ed) together to produce a parity bit. For example; a data word with an even number of 1's will have a parity bit of 0, and a data word with a odd number of 1's will have a parity bit of 1. If a single bit error occurs in the data word, the error can be detected by regenerating parity from the data and then checking to see that the calculated parity matches the originally generated parity stored with the word.

Richard Hamming recognized that this parity technique could be extended to not only detect errors, but also correct errors by appending a more intricate XOR field, referred to as an error correct code (ECC) field, to each code word. The ECC field is a combination of different bits in the code word XOR-ed together so that errors (small changes to the data word) can be easily detected, pinpointed and corrected. The number of errors that can be detected and corrected in a code word is directly related to the length of the ECC field. The challenge is to ensure a minimum separation distance between valid data words and code word combinations. As the number of errors that can be detected and corrected increases, the ECC field also increases in length, which creates a greater distance between valid code words (i.e., a greater Hamming distance). In current computer systems, RAM commonly is protected by ECC that supports Double-bit Error Detection (DED) and Single-bit Error Correction (SEC), which allows the RAM to recover from single-bit transient errors caused by alpha particles and cosmic rays, as well as single-bit hard errors caused by failure of RAM circuitry. The data held in HDDs are often similarly protected by checkers such as ECC, Cyclic Redundancy Checks (CRCs) and Longitudinal Redundancy Checks (LRCs).

In addition to error detection and correction facilities such as ECC, modern computer systems commonly protect data through data redundancy and/or distribution. For example, Redundant Array of Independent Disks (RAID) systems have been developed to improve the performance, availability and/or reliability of disk storage systems. RAID distributes data across several independent HDDs or SSDs. There are many different RAID schemes that have been developed each having different performance, availability, and utilization/efficiency characteristics.

RAID-0 is striping of data across multiple storage devices. RAID-1 is mirroring of data. RAID-3, RAID-4 and RAID-5 are very similar in that they all use a single XOR check sum to correct for a single data element error. RAID-3 is byte-level striping with a dedicated parity device. RAID-4 uses block level striping with a dedicated parity storage device. RAID-5 is block level striping like RAID-4, but distributes parity information substantially uniformly across all the storage devices rather than centralizing the parity information on a dedicated parity storage device. The key attribute of RAID-3, RAID-4 and RAID-5 is that each is capable of correcting a single data element fault when the location of the fault can be pinpointed through some independent means. This capability allows RAID-3, RAID-4 and RAID-5 to correct for a complete storage device failure. RAID-6 has no single universally accepted industry-wide definition. In general, RAID-6 refers to block or byte-level data striping with dual checksums. An important attribute of RAID-6 is that it allows for correction of up to two data element faults when the faults can be pinpointed through some independent means and has the ability to pinpoint and correct a single failure when the location of the failure is not known.

The present application appreciates that although single bit errors can often be swiftly corrected with little if any performance impact by conventional ECC mechanisms, storage systems suffer significant performance degradation when an error or failure is encountered that requires lost data to be recreated from multiple storage devices. For example, if a storage device failure occurs in a storage system employing a simple RAID3 parity scheme, recovery requires that corresponding data elements on each of the still functioning storage devices as well as the parity field needs to be read and then XORed together to reproduce the data from the failed storage device. In some conventional implementations, a complete rebuild of the contents of the failed storage device must be performed prior to any subsequently received storage access requests. In other conventional implementations, storage access requests continue to be serviced during the rebuilding process, but subject to significant bandwidth and/or performance degradation.

The present application appreciates that it would be highly useful and desirable to accelerate access to the contents of a data storage system following an error or failure.

BRIEF SUMMARY

In some embodiments, a data storage system includes a plurality of storage devices forming a storage array for storing data and associated error correction codes and a controller coupled to the plurality of storage devices. The controller is configured to, responsive to an error in a data element among the data, rebuild the data element from other data elements and an error correction code in the storage array and overwrite the error correction code with the rebuilt data element.

BRIEF DESCRIPTION OF THE SEVERAL VIEWS OF THE DRAWINGS

FIG. 4 is a data flow diagram illustrating the application of the process of FIG. 3 to a RAID-3 array.

DETAILED DESCRIPTION

Figure 1:
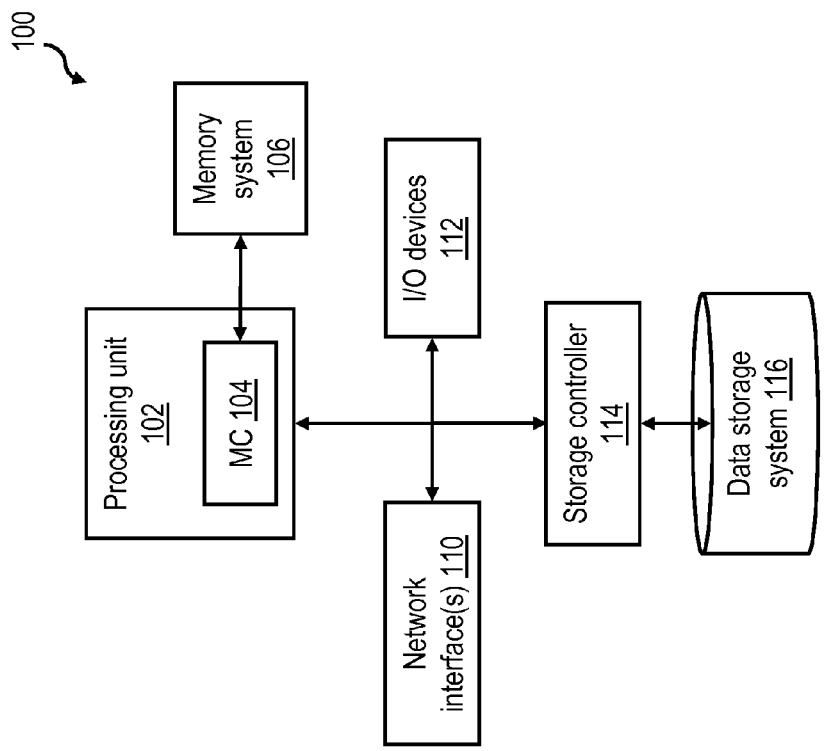
FIG. 1 is a high level block diagram of a data processing system in accordance with one embodiment.

With reference now to the figures and with particular reference to FIG. 1, there is illustrated a high level block diagram of an exemplary data processing system 100 in accordance with one embodiment. Data processing system 100, which can be, for example, a server computer system, laptop, tablet, smartphone, network switch, or an embedded system, includes one or more processing units 102 (typically comprising one or more integrated circuits) that process data and program code, for example, to manage, access, communicate and manipulate data or software in data processing system 100 and/or with a remote data processing system communicatively coupled thereto. Processing unit 102 includes a memory controller (MC) 104 that controls access to an attached memory system 106. Memory system 106, which can include either or both of volatile and non-volatile memory, provides low latency storage to software and data likely to be accessed by processing unit 102. To promote high performance and reliability, memory system 106 preferably includes multiple storage devices that store redundant copies of information and/or across which information is stored in a distributed fashion. For example, in one embodiment, memory system 106 may include multiple Dual Inline Memory Modules (DIMMs) each composed of a memory card bearing multiple Dynamic RAM (DRAM) devices (i.e., packaged chips). In other embodiments, alternative or additional memory technologies such as Flash memory, Phase Change Memory (PCM), etc., may be employed in memory system 106. In some embodiments, information within memory system 106 is protected utilizing by the application of one or more RAID-type schemes, such that memory system 106 comprises a Redundant Array of Independent Memory (RAIM).

As further illustrated in FIG. 1, data processing system 100 can also include one or more network interfaces 110 (e.g., network interface cards (NICs), converged network adapters (CNAs), wireless adapters, etc.), each of which provides an interface by which data processing system 100 can communicate data and software with remote storage devices and/or data processing systems. In addition, data processing system 100 may include input/output (I/O) devices 112, such as ports, displays, user input devices and attached devices, etc., which receive inputs and provide outputs of the processing performed by data processing system 100 and/or other resource(s) communicatively coupled thereto. Finally, data processing system 100 includes a storage controller 114 that controls access to a data storage system 116, which preferably includes a plurality of non-volatile storage devices, such as memories, SSDs, optical or magnetic disk drives, tape drives, etc., for storing program code (including software, firmware or a combination thereof) and data. Like the information within memory system 106, the information stored within data storage system 116 may also be protected through the utilization of one or more selected RAID schemes.

Figure 2:
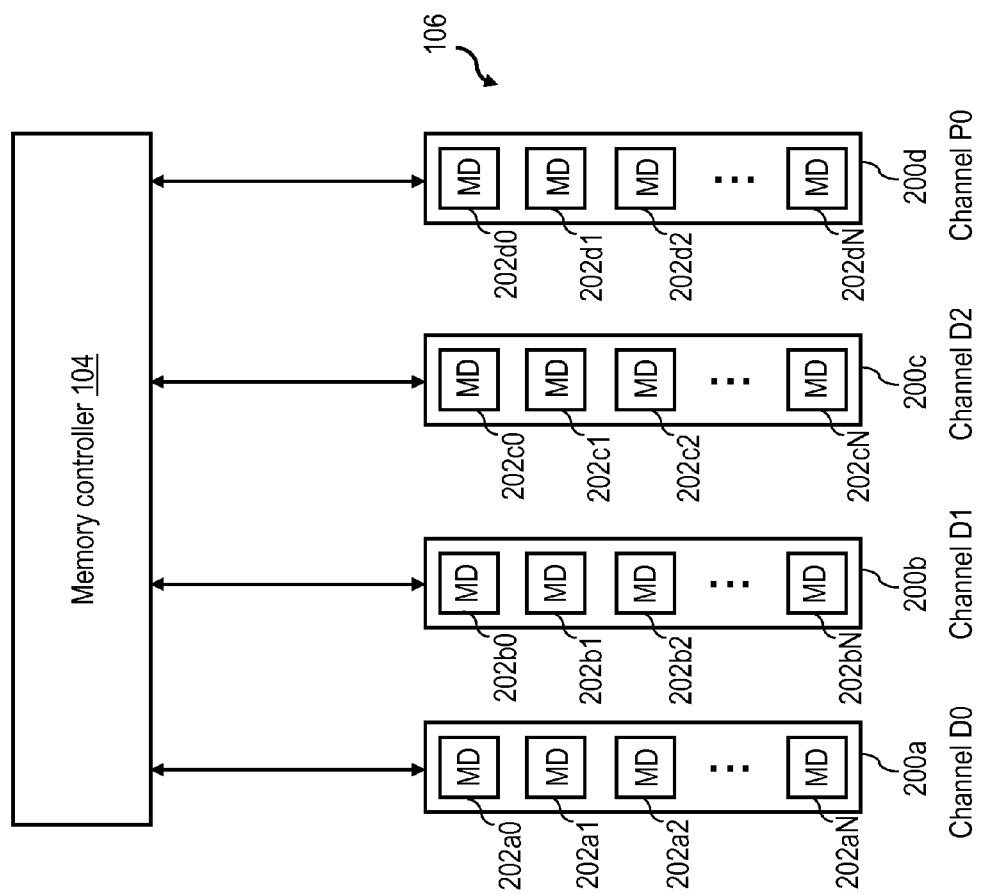
FIG. 2 is a more detailed view of an memory system 106 implementing a RAIM in accordance with one embodiment.

Referring now to FIG. 2, there is depicted a more detailed view of an exemplary memory system 106 implementing a RAIM in accordance with one embodiment. In the depicted embodiment, memory system 106 includes multiple (e.g., four) DIMMs 200a-200d, each including a plurality of memory devices 202. That is, DIMM 200a includes memory devices 202a0-202aN, DIMM 200b includes memory devices 202b0-202bN, DIMM 200c includes memory devices 202c0-202cN, and DIMM 200d includes memory devices 202d0-202dN.

The collection of memory devices 202 in DIMMs 200a-200d form an "array," which is defined herein as a collection of storage devices that hold symbols on which one or more instances of RAID or RAIM erasure code are implemented. A "symbol" or an "element" is defined as a fixed number of bytes or blocks (where a block is defined as a fixed number of bytes) forming the fundamental unit of data or parity. In this example, which depicts a RAID-3 RAIM, data and associated parity information is striped across DIMMs 200 such that each of DIMMs 200a-200c forms a respective one of independent data channels D0-D2, and DIMM 200d forms a parity channel P0. As employed herein, a "stripe" (also referred to as a code word or code instance) is a complete and connected set of data elements and parity elements that are dependently related to the parity computation relation calculated across this dependent set of data elements, and a "column" (also referred to as a "strip" or "stripe unit") is defined as is a collection of contiguous elements of a stripe that reside on one physical storage device (e.g., DIMM 200). Thus, in a RAID-3 implementation, each stripe stored within the array formed by DIMMs 200a-200d includes one data element stored in corresponding memory devices 202 in each of DIMMs 200a-200c and a parity element stored in DIMM 200d, which forms the dedicated parity channel. In an alternative embodiment in which memory system 106 implements a RAID-5 RAIM, all of DIMMs 200a-200d store both data and parity elements, and the parity elements of the different stripes are distributed across the various channels approximately evenly. Distributing parity across the storage devices is desirable to balance write performance, especially when the parity element is updated via a read-modified-write operation in which, instead of reading and XORing all the data elements with the new data to create an updated parity element, the new data and old data of only the storage device to be updated is XORed with the current parity element to generate the updated parity element. If parity information were stored on a single storage device, that storage device would be accessed during every write operation.

It should also be noted that each of memory devices 202 preferably includes conventional ECC circuitry that detects, locates, and, if possible, corrects memory errors occurring on read accesses. If an error occurs on a read access that cannot be corrected utilizing the conventional ECC circuitry (e.g., a failure of a memory device 202 or DIMM 200), memory controller 104 preferably recovers from the error by reading information from the other non-failing data channels and the parity channel and XORing the data and parity information together to reproduce the data from the failed channel. One example of a recovery process is described in greater detail below with reference to FIG. 3.

Although a specific example of a RAIM is given in FIG. 2, those skilled in the art will appreciate that the present invention is not limited to particular RAID scheme and that other RAID schemes may alternatively or additionally be employed in other embodiments. Further, those skilled in the art should appreciate upon reference to the disclosure contained herein that similar RAID schemes (and corresponding recovery techniques) may alternatively or additionally be applied by storage controller 114 of FIG. 1 to data storage system 116. Thus, data storage and recovery techniques disclosed herein are equally applicable to volatile and non-volatile storage arrays.

Figure 3:
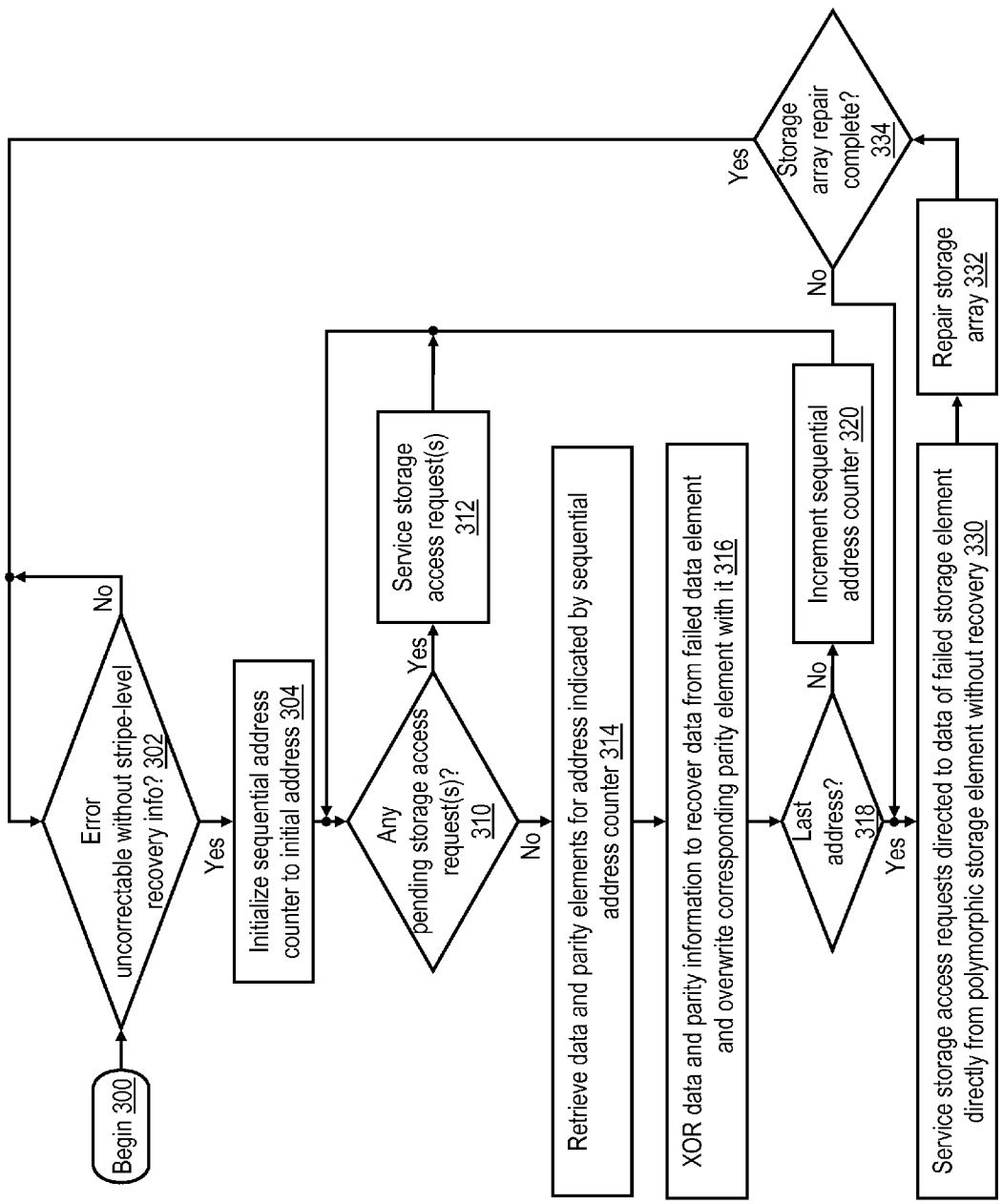
FIG. 3 is a high level logical flowchart of an exemplary process by which a controller performs data recovery utilizing storage element polymorphism in accordance with one embodiment.

With reference now to FIG. 3, there is illustrated a high level logical flowchart of an exemplary process by which a controller, such as memory controller 104 or storage controller 114, performs data recovery utilizing storage element polymorphism in accordance with one embodiment. The illustrated process can be performed entirely in hardware or by hardware configured by software and/or firmware, as known in the art. As a logical flowchart, it should be appreciated that at least some of the illustrated steps may in some implementations be performed in a different order than illustrated or concurrently.

The illustrated process begins at block 300 and then proceeds to block 302, which illustrates controller 104 or 114 continuously monitoring for an error in a data element of its storage array that is uncorrectable by ECC or other conventional error recovery mechanisms (e.g., CRC or LRC) that can correct errors without reference to stripe-level recovery information (e.g., parity information). Errors that cannot be corrected without reference to stripe-level recovery information may include, for example, a multi-bit error in an data element of a stripe, a bad disk sector, a failure of memory device 202, or a failure of an entire DIMM 200 or non-volatile storage device. In many implementations, the occurrence of such an error is detected and signaled to controller 104 or 114 by an ECC or other conventional error recovery mechanism. Until such an error is detected, controller 104 or 114 may service any storage access requests (e.g., read and write requests) directed to the array in a conventional manner, and one or more conventional error recovery mechanisms (e.g., ECC, CRC, LRC, etc.) either in the storage devices composing the storage array and/or incorporated in the controller 104 or 114 can be utilized to correct any correctable errors without reference to stripe-level recovery information.

In response to controller 104 or 114 detecting an error in a data element of its storage array that is uncorrectable without reference to stripe-level recovery information, controller 104 or 114 initiates a process of rebuilding data affected by the error as indicated by the process proceeding from block 302 to block 304. At block 304, controller 104 or 114 initializes a sequential address counter that tracks rebuild progress to an initial address corresponding to the base address of the error location (e.g., the base address of a first data element stored in a stripe affected by the error). For example, in the embodiment of FIG. 2, the sequential address counter may be initialized to a base address corresponding to the first data elements stored in memory devices 202a0, 202b0, 202c0 of DIMM 200a-200c. As indicated at blocks 310-312, during the rebuilding process, controller 104 or 114 preferably gives priority to any storage access requests (e.g., read or write requests) that are received (e.g., from processing unit 102 or a remote data processing system) by immediately servicing the storage access request(s) rather than deferring them until completion of the rebuilding process.

As will be appreciated, such storage access requests may include both requests targeting stripes impacted by the error and requests targeting stripes or portions of stripes that are unaffected by the error. At block 312, controller 104 or 114 may service requests targeting stripes or portions of stripes unaffected by the error, if any, in a conventional manner. Assuming implementation of a RAID-3 or RAID-5 array, for example, controller 104 or 114 may service a read request for data residing in a data element affected by an error by reading the parity element and each data element in which an uncorrectable error was not detected (i.e., the "good" data elements) from the data stripe, XORing the good data elements together with the parity element to obtain a recovered data element, and supplying the recovered data element and any good data elements that are also requested to the requester. Servicing a write request targeting a data element in which an uncorrectable error was detected can include, for example, controller 104 or 114 reading the parity element and each data element in which an uncorrectable error was not detected (i.e., the "good" data elements) from the data stripe, XORing the good data elements together with the parity element to obtain a recovered data element, XORing the recovered data element with the good data elements to obtain an updated parity element, and writing the updated parity element to the array. Thus, controller 104 or 114 preferably refrains from attempting to write data specified by a write request to the data element in which the uncorrectable error was detected, as the updated data can be recovered from the remaining good data elements and the parity element of the relevant stripe.

Utilizing resources that are not required to service storage access requests, controller 104 or 114 rebuilds data elements of stripes affected by the error in the background. For example, at block 314, controller 104 or 114 retrieves good data elements and the parity element for the address indicated by the sequential address counter. At block 316, controller 104 or 114 computes an XOR of the good data elements and the parity element to recover the data element affected by the error and then overwrites the parity element of the stripe with the recovered data element. Thus, the storage element that formerly held the parity element and thereafter holds the recovered data element can be referred to as polymorphic storage element.

Figure 4:
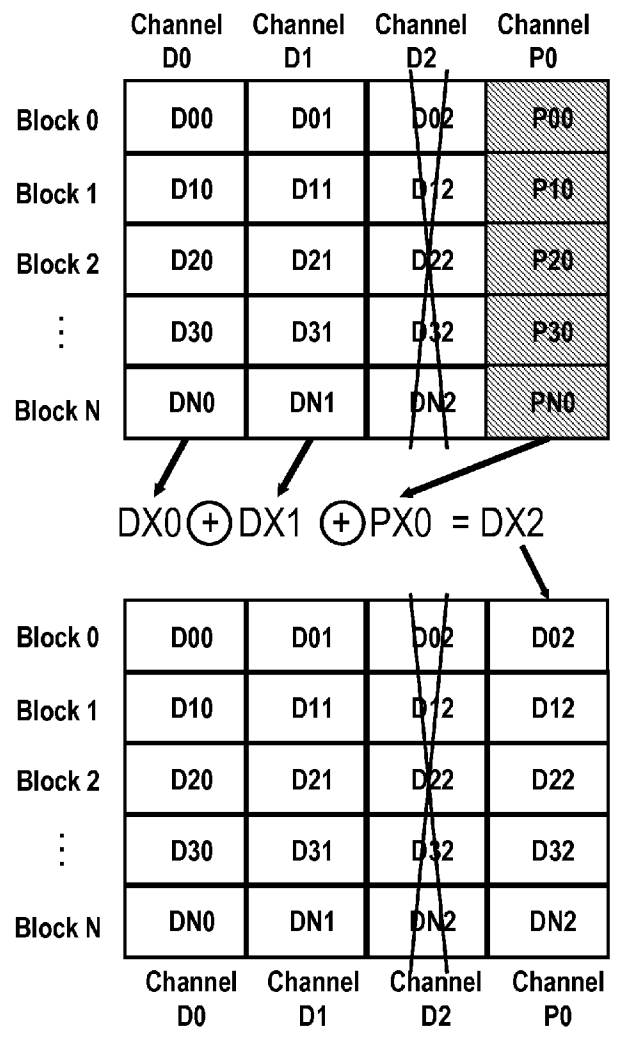

Referring now to FIG. 4, a data flow diagram of the recovery of a data element in a RAID-3 array is depicted. In this example, an array includes three data channels, D0, D1 and D2, and a dedicated parity channel P0 (the parity element of each stripe is illustrated with shading for clarity). In response to a failure of channel D2, for example, due to the failure of an entire DIMM 200c or non-volatile storage device, controller 104 or 114 rebuilds each of data elements D02, D12, D22, D32, . . . , DN2 of channel D2 by XORing the good data blocks and parity block from the corresponding stripes according to the formula:

$$DX0 \oplus DX1 \oplus PX0 = DX2, \text{ where } X=0 \ldots N$$

Controller 104 or 114 then overwrites the corresponding parity element with the recovered data element (i.e., each element PX0 is overwritten by recovered data element DX2).

Figure 5:
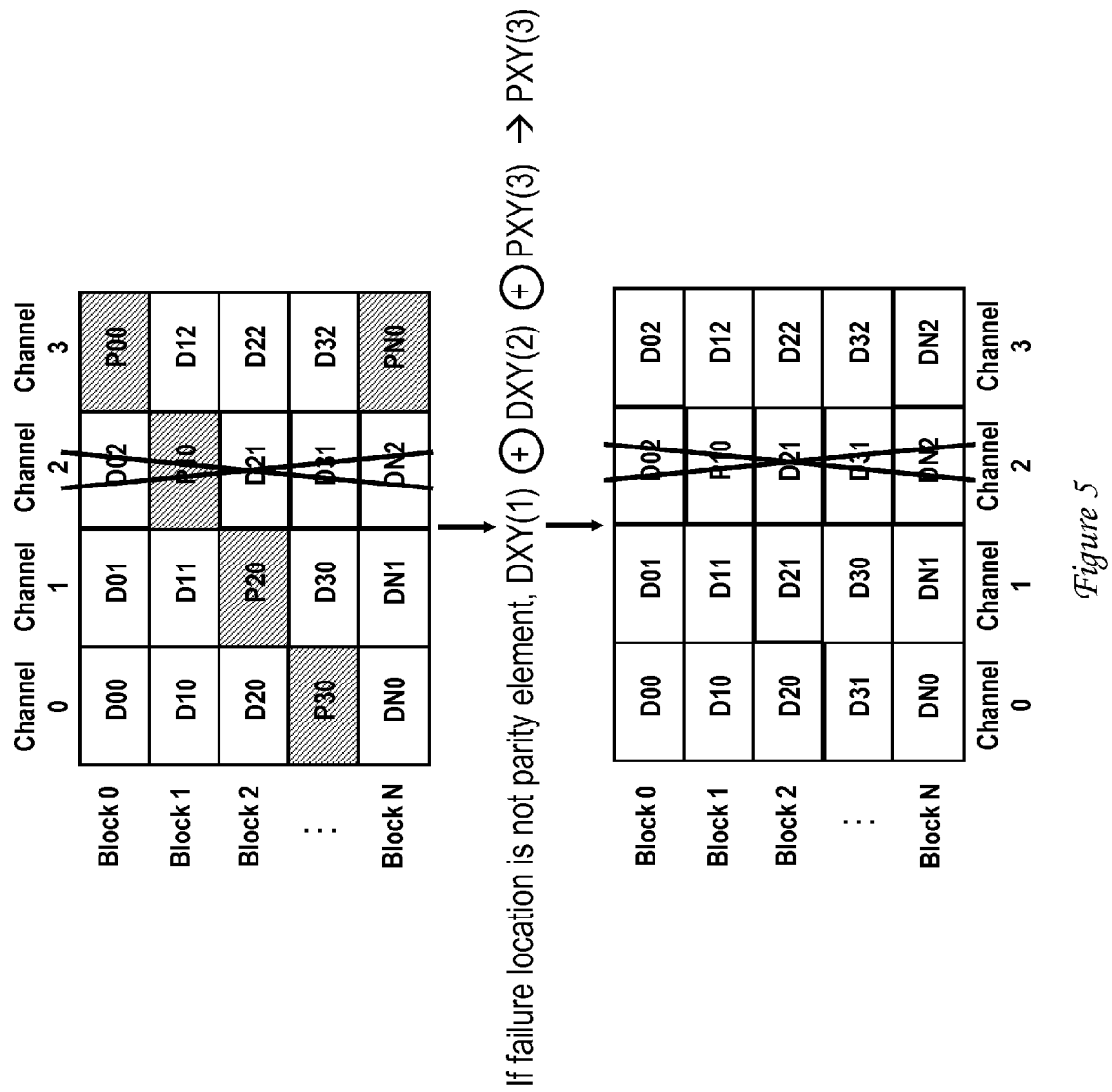
FIG. 5 is a data flow diagram illustrating the application of the process of FIG. 3 to a RAID-5 array.

FIG. 5 illustrates the application of a similar rebuilding process to a RAID-5 array. In this example, the array includes four channels, and each stripe held in the array includes three data elements and a parity element (the parity element of each stripe is again illustrated with shading for clarity). However, unlike the RAID-3 example, in the RAID-5 array the parity elements of the various stripes are distributed among the four channels rather than centralized in a dedicated parity channel. In response to a failure of channel 2, for example, due to the failure of an entire DIMM 200c or non-volatile storage device, controller 104 or 114 rebuilds each data elements D02, D21, D31, . . . , DN2 of channel D2 by XORing the good data elements and parity element from the corresponding stripes. Controller 104 or 114 then overwrites the parity element of the stripe with the recovered data element. It should be noted that no recovery is required or performed for stripes in which the parity element resides in the failed channel.

Returning to FIG. 3, following block 316, controller 104 or 114 determines at block 318 whether or not the sequential address counter has reached a last address to be recovered. If not, controller 104 or 114 increments the sequential address counter at block 320, and the process iteratively returns to block 310. However, in response to controller 104 or 114 determining at block 318 that the last address has been reached, meaning that the rebuilding process has completed, the process proceeds from block 318 to block 330.

As indicated at block 330, following the rebuilding process, controller 104 or 114 thereafter services storage access requests directed to data formerly residing in a failed data element directly from the polymorphic storage element without performing any recovery operation. For example, referring again to FIG. 4, a controller 104 or 114 may service a read request for data element D02 directly from block 0 of channel P0 in lieu of having to recover data element D02 from data elements D00 and D01 and parity element P00. Thus, the latency of accesses to data recovered by the rebuilding process is significantly reduced as compared to prior art systems that must recreate data affected by the error on every access. Those skilled in the art will appreciate that the step illustrated at block 330 may include, for example, controller 104 or 114 updating one or more internal address translation tables or building an address aliasing table in order to appropriately redirect storage access requests.

As shown at blocks 332-334, while servicing storage access requests as illustrated at block 330, controller 104 or 114 also monitors for completion of repair of the storage array, including, if necessary, replacement of the storage element that caused the error that triggered the rebuilding process. In the examples given in FIGS. 4-5, this repair may be performed, for example, by physical replacement of the DIMM 200 or storage device serving as channel 2. In other scenarios, the repair of the storage array may include controller 104 or 114 bringing online an already present spare circuit, memory device, or non-volatile storage device.

The repair of the storage array depicted at block 332 also preferably includes controller 104 or 114 recomputing parity information for each stripe affected by the error and storing the parity information in the repaired or replaced storage device. In this manner, repair is accelerated because controller 104 or 114 need not transfer data from the polymorphic storage elements to the repaired or replaced storage device. It is particularly desirable to minimize rebuilding or reorganizing the stored data during the repair when the array includes larger and slower storage devices such as HDDs. In most systems, it is straight forward for the controller 104 or 114 to virtualize the allocation of channels to storage devices, for example, by utilizing a simple flag structure, a data structure, or hash computation that designates which channels hold data and which channel(s) hold parity information.

During the repair interval between completion of the rebuilding process depicted at blocks 304-320 and completion of the repair of the storage array at block 334, the ability of the storage array to recover from errors is degraded or may be lost entirely. For example, in the RAID-3 and RAID-5 examples discussed above, if a secondary error necessitating stripe-level recovery occurs (i.e., an error that cannot be corrected by ECC or other conventional lower level mechanism), the error will result in an unrecoverable failure. It should be noted that the vulnerability of the storage array to secondary errors is not attributable to the reduction or elimination of available parity information following the rebuilding process, but rather to the inherent limitations of the selected error recovery scheme itself. Assuming an unrecoverable error does not occur during the repair interval, controller 104 or 114 resumes normal operation in response to controller 104 or 114 determining at block 334 that the repair of the storage array is complete, and the process of FIG. 3 returns to block 302, which has been described.

In the embodiment of the recovery methodology depicted in FIG. 3, controller 104 or 114 tracks progress of the rebuilding process using only a sequential address counter. A benefit this approach is its simplicity as only the first and last addresses at which data is to be rebuilt need to be tracked. In an alternative embodiment, controller 104 or 114 could additionally maintain a status flag, for example, for each stripe to be rebuilt. As independent storage access requests that require regeneration of data from a failed storage element are serviced during the rebuild process, the corresponding parity element could be over written by the rebuilt data element so that the rebuilding would not have to be performed again when the address is reached by the sequential rebuilding process. In yet another embodiment, out-of-sequence rebuilding of data elements is supported, but any stripes rebuilt out-of-sequence to service storage access requests are tracked in a data structure, such as a list or table, rather than by utilizing status flags. This embodiment also provides the benefit of more quickly converting addresses accessed by storage access requests, while not requiring the storage overhead associated implementation of a status flag for every stripe/address.

As has been described, in some embodiments, a data storage system includes a plurality of storage devices forming a storage array for storing data and associated error correction codes and a controller coupled to the plurality of storage devices. The controller is configured to, responsive to an error in a data element among the data, rebuild the data element from other data elements and an error correction code in the storage array and overwrite the error correction code with the rebuilt data element. Although specific embodiments have been described that employ RAID-3 and RAID-5 error recovery schemes, those skilled in the art will appreciate that the techniques disclosed herein apply more generally to data storage systems employing one or more error correction codes for each code word, where such error correction codes are not limited to parity code words, but can be, for example, Reed-Solomon codes.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been particularly shown as described with reference to one or more preferred embodiments, it will be understood by those skilled in the art that various changes in form and detail may be made therein without departing from the spirit and scope of the invention.

What is claimed is:
1. A data storage system, comprising:
a controller configured to control access to a plurality of storage devices forming a storage array for storing data and associated error correction codes, wherein the controller is configured to, responsive to an error in a data element among the data, rebuild the data element from other data elements and an error correction code in the storage array and overwrite the error correction code with the rebuilt data element, wherein the controller, after the data element is rebuilt, retains the rebuilt data element in a storage element that formerly held the error correction code, regenerates the error correction code, and stores the regenerated error correction code in another storage element.

2. The data storage system of claim 1, wherein:
the error correction code is a parity element; and
the controller rebuilds the data element by logically combining the other data elements and the parity element utilizing an exclusive-OR operation.

3. The data storage system of claim 2, wherein:
the storage array implements a RAID-3 error recovery scheme; and
the storage array includes multiple data channels and a dedicated parity channel that stores the parity element.

4. The data storage system of claim 2, wherein:
the storage array implements a RAID-5 error recovery scheme; and
the storage array includes multiple data channels across which the data and the error correction codes are distributed.

5. The data storage system of claim 1, wherein:
the error includes a failure affecting multiple addresses; and
the controller is configured to rebuild multiple data elements corresponding to the multiple addresses substantially sequentially, wherein the multiple data elements include the data element.

6. The data storage system of claim 5, wherein:
the controller, while rebuilding the multiple data elements substantially sequentially, rebuilds at least one of the multiple data elements out-of-sequence in response to a storage access request; and
the controller tracks data elements rebuilt out-of-sequence utilizing a data structure.

7. The data storage system of claim 1, and further comprising the plurality of storage devices coupled to the controller.

8. The data storage system of claim 1, wherein:
the plurality of storage devices include a plurality of volatile memory devices; and
the controller is a memory controller.

9. A program product, comprising:
a storage device; and
program code stored in the storage device, wherein the program code, when executed, causes a controller of a data storage system to perform:

a controller detecting an error in a data element stored in a storage array including a plurality of storage devices for storing data and associated error correction codes; and
in response to detecting the error in the data element:
the controller data rebuilding the data element from other data elements and an error correction code in the storage array; and
the controller overwriting the error correction code with the rebuilt data element; and
after the data element is rebuilt, the controller retaining the rebuilt data element in a storage element that formerly held the error correction code, regenerating the error correction code, and storing the regenerated error correction code in another storage element.

10. The program product of claim 9, wherein:
the error includes a failure affecting multiple addresses; and
the rebuilding includes the controller rebuilding multiple data elements corresponding to the multiple addresses substantially sequentially, wherein the multiple data elements include the data element.

11. The program product of claim 10, wherein the program code, when executed, further causes the controller to perform:
the controller, while rebuilding the multiple data elements substantially sequentially, rebuilding at least one of the multiple data elements out-of-sequence in response to a storage access request; and
the controller tracking data elements rebuilt out-of-sequence utilizing a data structure.

12. The program product of claim 9, wherein:
the error correction code is a parity element; and
the program code, when executed, causes the controller to rebuild the data element by logically combining the other data elements and the parity element utilizing an exclusive-OR operation.

13. The program product of claim 12, wherein:
the storage array includes multiple data channels and a dedicated parity channel that stores the parity element; and
the program code, when executed, causes the controller to implement a RAID-3 error recovery scheme for the storage array.

14. The program product of claim 12, wherein:
the storage array includes multiple data channels across which the data and the error correction codes are distributed; and
the program code, when executed, causes the controller to implement a RAID-5 error recovery scheme for the storage array.

* * * * *